United States Patent [19]

Andow et al.

[11] 4,371,908
[45] Feb. 1, 1983

[54] DIGITAL PROTECTIVE RELAYING SYSTEMS

[75] Inventors: Fumio Andow, Hachioji; Takayuki Kobayashi; Ryotaro Kondow, both of Fuchu; Yoshiji Nii, Kawaguchi, all of Japan

[73] Assignee: Tokyo Shibaura Denki Kabushiki Kaisha, Kawasaki, Japan

[21] Appl. No.: 345,356

[22] Filed: Feb. 3, 1982

Related U.S. Application Data

[63] Continuation of Ser. No. 75,927, Sep. 17, 1979, abandoned.

[51] Int. Cl.³ .............................................. H02H 3/30
[52] U.S. Cl. ........................................ 361/83; 361/84; 361/81; 361/68; 364/492; 364/480; 364/483
[58] Field of Search ................ 361/81, 83, 82, 84, 361/80, 85, 86, 87, 63, 67, 68, 62, 64; 364/480, 482, 483, 111, 107, 492; 324/51; 340/310 R

[56] References Cited

U.S. PATENT DOCUMENTS

| | | | |
|---|---|---|---|
| 3,339,115 | 8/1967 | Calhoun | 361/82 |
| 3,524,106 | 8/1970 | Paddison et al. | 361/80 |
| 3,590,368 | 6/1971 | Esclangon | 361/80 X |
| 3,599,044 | 8/1971 | Takemura et al. | 361/82 |
| 3,643,160 | 2/1972 | Ray et al. | 361/80 X |
| 3,842,249 | 10/1974 | Geyer et al. | 364/492 |
| 3,984,737 | 10/1976 | Okamura et al. | 361/80 |
| 4,148,087 | 4/1979 | Phadke | 361/81 X |
| 4,161,027 | 7/1979 | Russell | 364/492 |
| 4,228,467 | 10/1980 | Okita et al. | 364/492 X |

*Primary Examiner*—Patrick R. Salce
*Attorney, Agent, or Firm*—Stevens, Davis, Miller & Mosher

[57] ABSTRACT

In a digital protective relaying device for protecting electric power transmission line including an electric station at each end thereof, and each electric station including at least one circuit breaker to be tripped by a protective relay for protecting the own station, a digital protective relay provided with a computer is further provided at each end so as to receive electrical data in digital form from the electric stations for operating in an ordinary protective operation. As a control condition occurs in one station, the condition is sent to a digital protective relay provided at the other end of the transmission line, thereby changing the operational steps of the computer included in the protective relay.

5 Claims, 12 Drawing Figures

DIGITAL PROTECTIVE RELAYING SYSTEMS

This is a continuation of application Ser. No. 75,927, filed Sept. 17, 1979; now abandoned.

BACKGROUND OF THE INVENTION

This invention relates to digital protective relaying systems wherein various electrical values of an electric power system are converted into digital coded signals, and are used to operate protective relays for protecting the power system.

Heretofore known protective relaying devices utilizing analogue values obtained from current transformers (CT), potential transformers (PT) or a potential device (PD) and the like for the protection of electric power transmission lines, are roughly classified into distance relay devices, wherein electric values originated from only an electric station (or the own station) connected to one end of the power transmission line are used for the protection of the same, and phase comparison relay devices wherein the protection of the power line system is carried out by utilizing electric data of the own station and a remote station. In these conventional protective relay devices, the outputs of the CT, PT (or PD), and the like are converted, in the protective relay devices, into signals suitable for the protective devices used. For instance, in the phase comparison relay devices, the current data from the remote end is converted into a phase comparison signal, which is transmitted over a specially provided channel so that it is compared with a phase comparison signal originated from the own end power station for protecting the power line system.

In either of the relay devices, however, recent rapid increase in capacity of the power line system and the complication of the construction necessitated frequent change of the protective settings or of the type of the protective devices, such a change being found extremely troublesome.

On the other hand, along with the recent progress in digital computers, digital control of electric power systems has now become a common practice. In this control system, the analogue outputs from the CT, PT (or PD) are sampled, and converted into digital signals by an A/D converter, and the measurement, control, and the protection of the power system are accomplished by means of a digital computer and the like, utilizing digital processing techniques. In this manner, the measurement, control, and the protection can be attained by utilizing common data, thus reducing the required number of cables, and the aforementioned change of the settings and the like can be accomplished by modifying the software or the program.

Various digital protective relaying systems adapted for use in the computer controlled power line system have been developed in various countries. However, so far as we are aware, no fully established protective relaying system has not yet been proposed.

SUMMARY OF THE INVENTION

A primary object of the present invention is to provide a digital protective relay device for power transmission line systems wherein the above described disadvantages of the conventional protective relay devices can be substantially eliminated.

Another object of the invention is to provide a digital protective relay device whereby accurate and reliable protection of power line systems can be assured regardless of the kinds of the control conditions (or protective conditions) which may occur in the electric power transmission systems.

Still another object of the present invention is to provide a digital protective relay device wherein any change in the manner of operation upon occurrence of a control condition can be realized by changing the operational program stored in a digital computer without requiring any change in the hardware.

A further object of the present invention is to provide a digital protective relay device wherein various control conditions, such as those in the hereinlater described countermeasures for blind point fault, initial charging, locking of a signal transmitting device, and for the inoperative (or in maintenance) terminals in the case of a multiterminal transmission system, can be handled without changing the setting and the construction of the protective relay device.

According to the present invention, there is provided a digital protective relaying device for protecting an electric power transmission system including an electric power transmission line having a first electric station and a second electric station at both ends thereof, each station including a circuit breaker, a disconnecting switch, at least one electrical apparatus protected by a differential protective relay having two current detecting elements on both sides of the apparatus, the power transmission system being further provided, at the first and second electric stations, with detectors for detecting electric values related to the inputs into the electric power transmission line, A/D converters for converting the outputs of the detectors into digital values, respectively, first and second data transmitting and receiving terminals each connected to receive the output of the A/D converter and to send the same to the data transmitting and receiving terminal of the opposite end through a data transmitting line extending between the two terminals, and first and second protective relays each connected to receive the outputs of the two A/D converters, one directly and the other through the data transmitting line, the improvement wherein each of the first and second protective relays is provided with a digital computer which upon reception of a control condition from the other station, changes the data processing steps of the relaying operation.

DESCRIPTION OF PREFERRED EMBODIMENTS

Figure 1:
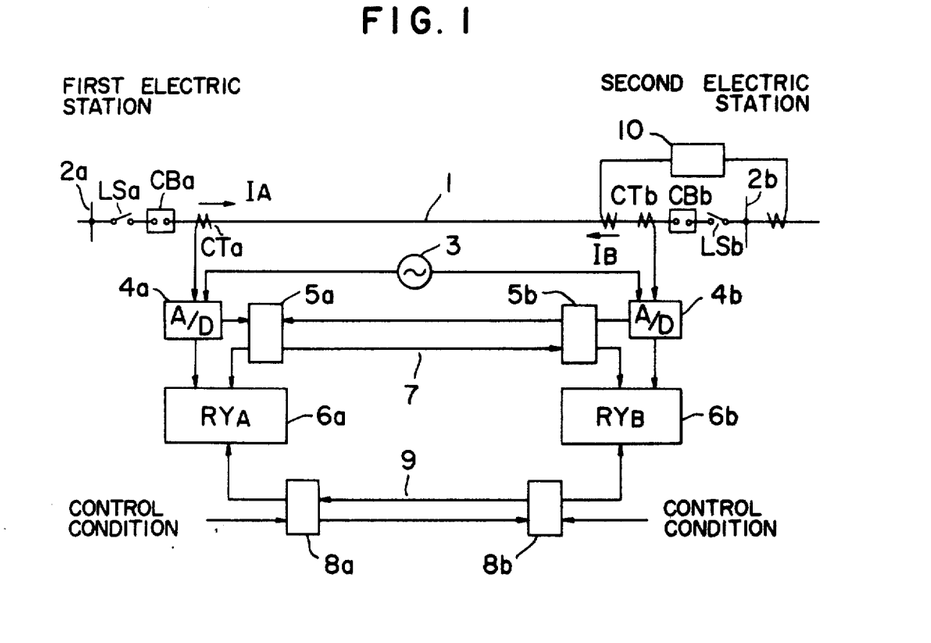
FIG. 1 is a block diagram showing one embodiment of the present invention.

In FIG. 1, there is illustrated one embodiment of the present invention which takes the form of a current-differential protective device applied to a two-terminal transmission line 1.

In this embodiment, the transmission line 1 to be protected extends between the two terminal stations (or power plants) A and B, and is connected to the bus bars 2a and 2b through disconnecting switches LSa and LSb and circuit breakers CBa and CBb. Electric currents $I_A$ and $I_B$ flowing into the transmission line 1 from the two terminal stations A and B are picked up by respective current transformers $CT_A$ and $CT_B$, and introduced into analogue/digital converters 4a and 4b connected to a common oscillator 3. In this manner, the currents flowing from the two terminal stations (or power stations) are A/D converted simultaneously, and the converted signals are sent to data transmitting and receiving devices 5a and 5b and digital protective relays 6a and 6b, respectively.

Thus, the current data converted into digital form and introduced, for instance, into the signal transmitting device 5b are transmitted toward the opposite end through a data transmitting (or pilot) line 7, and the current data in digital form received in the opposite device 5a are supplied into the digital protective relays 6a, and vice versa. The protective relay 6a or 6b ordinarily comprises a digital processing device such as a minicomputer or a microcomputer which can provide a current-differential protection based on the current data obtained from the own end and the opposite end of the data transmission lines 7 under the control of a program memorized or stored in the microcomputer contained in the digital protective relay 6a or 6b. Control condition transmitting and receiving devices 8a and 8b are further provided to exchange required control conditions as described hereinafter through data transmission lines 9, and the received data are applied to the digital protective relays 6a and 6b, respectively, for controlling the process steps, or ordinarily the controlling program.

The control condition may constitute any one of: opening of the circuit breakers such as CBa and CBb, opening of the disconnecting switches LSa and LSb, and blocking of the signal transmitting devices 5a and 5b.

Figure 2:
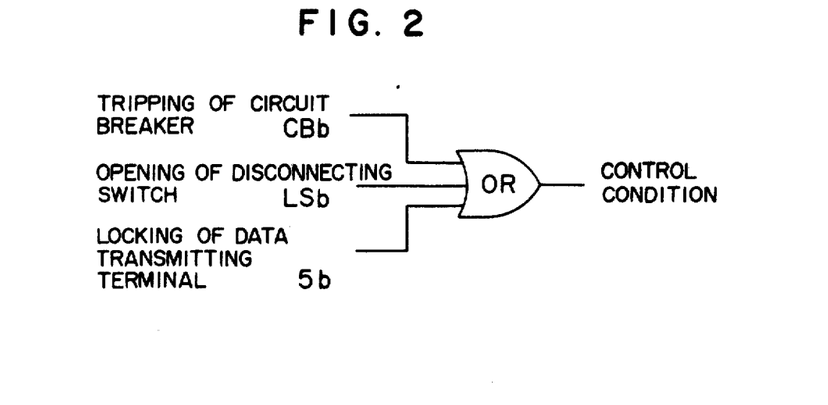
FIG. 2 is one example of forming a control condition used in the present invention.

In FIG. 2, there is indicated an example for providing the control condition at the station B. In this example, logic OR is taken for
  (1) opening of the circuit breaker CBb,
  (2) opening of the disconnecting switch LBb,
  (3) blocking of the transmitting device 5b,
and the operation of the protective relay 6a is modified when any one of the three conditions holds. Numeral 10 designates a bus protective relay which will be described in more detail hereinafter.

Before entering the description of the operation of the protective relaying device shown in FIG. 1, certain background items will be described. In FIG. 1, the range of the transmission line protected by the differential protection procedure is the part between the current transformers CTa and CTb. When a trouble occurs in this range, tripping instructions are applied to the circuit breakers CBa and CBb in accordance with the differential protection procedure, and the fault is removed out of the range. However, when a fault F occurs between current transformer CTb and the circuit breaker CBb, the circuit breaker CBb is tripped by the operation of the bus line protective relay 10. However, since this fault F is outside of the differential protection range between the current transformers CTa and CTb along the electric power transmission line, the circuit breaker CBa in the electric station A is not tripped, and the fault F cannot be thereby cleared. This fault F is hereinafter termed a "blind point fault". Furthermore, there is a case wherein at the time when the bus line 2b in the station B is initially charged by the station A, any bus line fault which might be caused by, for instance, overlooking the clear of grounded lines must be detected and protected by the protective device for the transmission line 1. Such a procedure is termed an "initial charging countermeasure". In still another case, where for instance maintenance operation is performed on a transmission device 5b at the end B of the power transmission line 1, the current data for the station B cannot reach the station A, and therefore the protection of the transmission line 1 must be performed with reference being made only to the current data from the station A. Such a procedure is termed "lock countermeasure", and is performed when either of the transmission devices 5 and 8 is locked. In addition to the above described countermeasures, there is a case where one end of the transmission line 1 is connected with a number of stations similar to the station B, which is hereinafter termed a multiterminal transmission system, and in this case when maintenance operation is performed for one of the stations of such a power transmission system, a problem arises as to how the protections are carried out for the transmission line and the related bus lines other than those subjected to the maintenance operation.

According to this invention, the above described difficulties can be eliminated, and various countermeasures such as for the blind-point fault, initial charging difficulties, locking of the transmission device, and for the inoperative terminal can be carried out.

Even in the case where none of the control conditions holds, the digital protective relays 6a and 6b are performing differential protective calculations based on the current data obtained at the same instant from both ends of the transmission system. When a fault occurs at the blind point F between CTb and CBb, the breaker CBB is tripped by the bus-line protective device 10. The tripping of the circuit breaker CBb establishes a control condition, and a control condition holding signal is sent to the digital protective relay 6a through the transmission devices 8a, 8b over the control signal transmission line 9. The digital protective relay 6a contains, for instance, a microcomputer which, upon reception of the control condition holding signal, controls the process steps of the differential protection.

Figure 3:
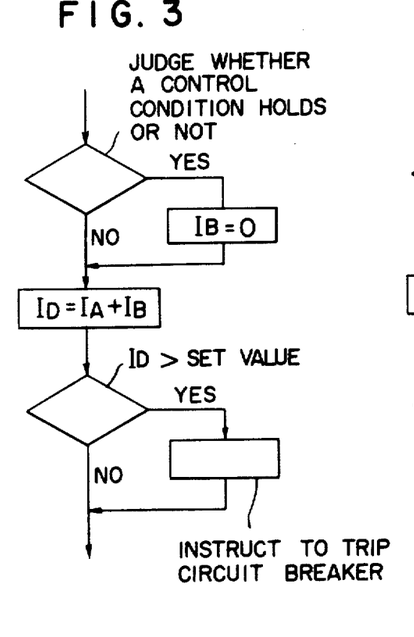
FIGS. 3 and 4 are flow charts showing differential (or vector sum) operations of a protective relay.
Figure 4:
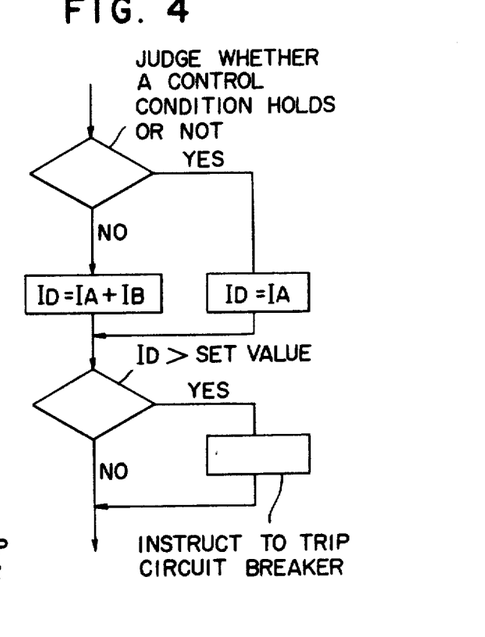

FIGS. 3 and 4 are flow charts showing two kinds of operations of the digital protective relays 6a and 6b each containing a microcomputer, both of the operations being of simplest differential protection utilizing vector sum $I_D$ of two end currents $I_A$ and $I_B$ of the transmission line as an operative value of the protective relay. In one of the operations shown in FIG. 3, when a control condition holds (that is, when either one of the circuit breaker CBb and disconnecting switch LSb is opened, or the transmitting device 5b is locked), the current $I_B$ flowing into the control condition holding terminal B is assumed to be zero regardless of its actual value, and the operative value $I_D$ is calculated. When this value $I_D$ is greater than a predetermined set value, the circuit breaker CBa is tripped.

In another operation shown in FIG. 4, when a control condition holds, a differential protection is carried out excepting the terminal where the control condition holds. In the case of the two terminal transmission line as described above, if the current $I_B$ of the terminal B where the control condition holds is excepted, the resultant operative value $I_D$ is made equal to the current $I_A$ of the terminal A, and the flow chart will be equivalent to that of FIG. 3.

In either of the cases, when control condition holds in the terminal B, the current $I_B$ obtained from CTb is neglected, and the protection is performed utilizing only a current data from the terminal A. When the current $I_A$ exceeds a preset value, the circuit breaker CBa in the terminal A is tripped, and the above described blind point fault can be cleared. More specifically, when the control condition holds in the terminal B, the protecting range of the digital protective relay 6a is expanded to include the entire portion of the line to the right of the current transformer CTa in FIG. 1.

Likewise, when a maintenance is performed at one end of the power system, since either one of the circuit breaker or the disconnecting switch of a station in which maintenance operation is being performed is opened, the protective relay can be operated regardless of unlocking of the transmitting device.

Furthermore, at the time of the initial charging of the line, if the transmitting device 5b is locked, a control condition holds, and the range of the protective relay 6a is thereby expanded. More specifically, when the electric station B is charged from the electric station A in FIG. 1, if the transmitting device 5b is locked, the control condition for the station B holds, and the protecting range of the digital protective relay device for the station A is expanded to include the bus line 2b of the station 3, and any fault in the bus line 2b can be surely cleared. Likewise the control condition for the station B holds when the transmitting device 5b is inspected or repaired, and the operating range of the digital protective relay 6a can be expanded without locking the protective relay 6b.

Figure 11:
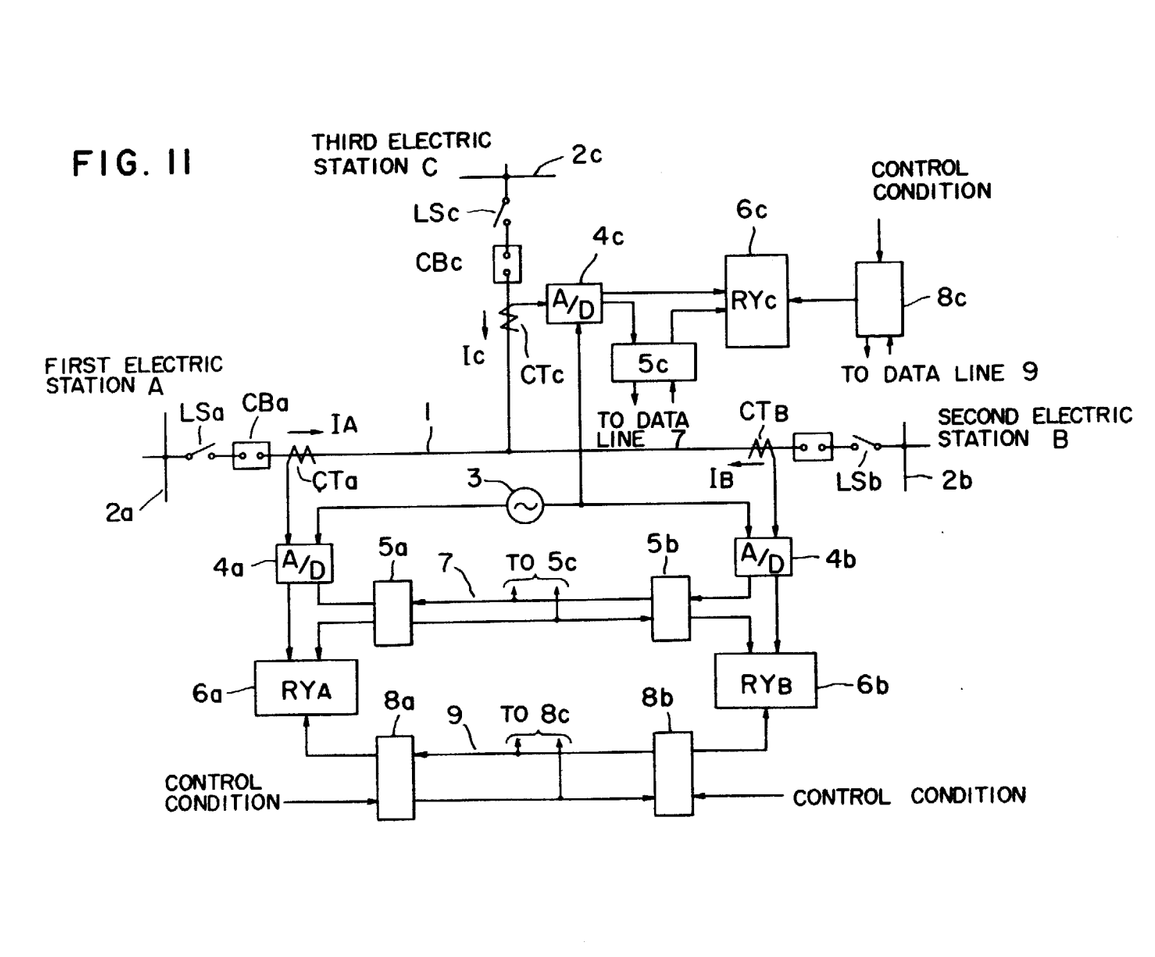
FIG. 11 is a block diagram showing still another embodiment of the present invention, which is applied to a multiterminal transmission system.
Figure 12:
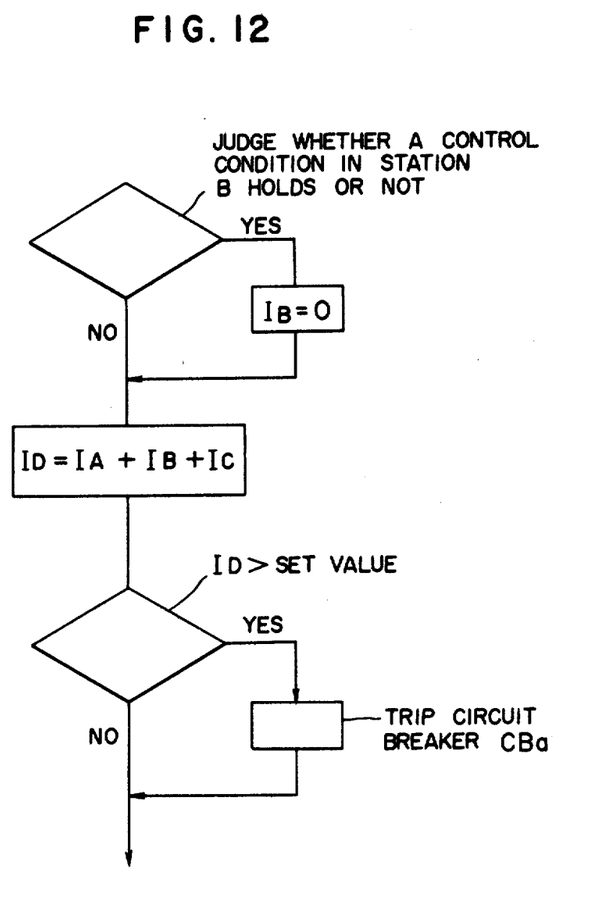
FIG. 12 is a flow chart showing the operation of FIG. 11.

Although the invention has been described with respect to a differential protective relay device for a two-terminal power transmission line, it is apparent that the invention is also applicable to a protective relay device used for the multiterminal electric power transmission system having 3 or more terminals with equal advantages, among which a case having 3 terminals is described hereinlater with reference to FIGS. 11 and 12. In the multiterminal transmission system having a number of terminal stations, the number of stations suspending their service increases, and therefore the application of the conventional protective relay device to such a system was found difficult.

In the example of FIG. 1, although the transmission devices have been provided separately for the control condition holding signal and for the current data because of clarity of the description, it is apparent that these transmission devices may be provided in combination for economizing the construction. The current data and the control condition signal may be transmitted in digital form by utilizing any well known transmitting technique such as pulse-code modulation.

Figure 5:
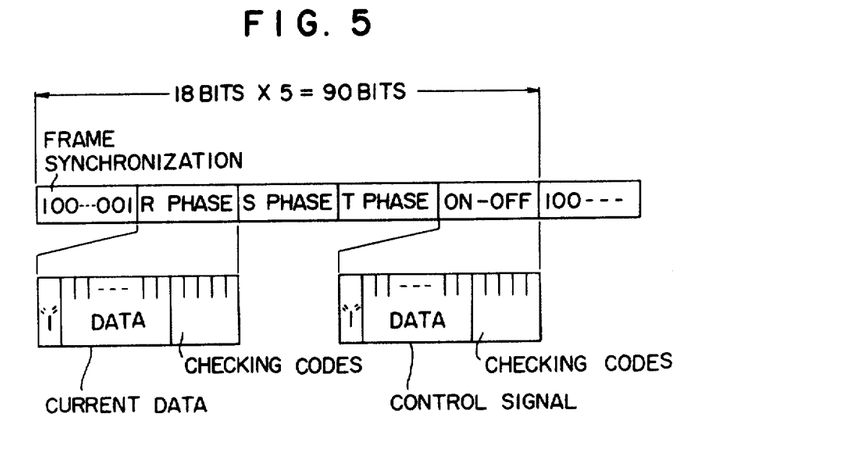
FIG. 5 is a diagram showing a transmission format of protective data.

In FIG. 5, there is illustrated one example of a transmission format (or an arrangement of codes) to be used in the aforementioned case. In this format, 18 bits are used for the synchronization of the signal, 18 bits for the transmission of each of the three phase currents, and 18 bits for the transmission of the control signal (ON-OFF bits), thus a total of 90 bits constituting one frame. Each word transmitting the current and the control signal requires a first bit for the separation of the word, the following 12 bits for representing digitally coded current data or control signal, and remaining 5 bits for checking errors.

In the above described cases, there is a problem in transmitting the condition of the transmitting device to the other station. In one method, use is made of the fact that the locking of the transmitting device is always performed manually, and a code pattern meaning that the locking is now to be performed is transmitted by the ON-OFF bits before the transmitting device is actually locked. The digital protective relay interprets the code pattern, and carries out the protective operation. When the locking of the transmitting device is to be released, another coded pattern meaning unlocking of the device is sent after the transmitting device has been brought back to its normal condition, and this pattern is interpreted by the digital protective relay, and the relay recovers its ordinary operation.

At this time, it is essential that unique code patterns which can hardly occur during the handling of the transmitting device and the like be selected for the code pattern indicative of locking and unlocking of the transmitting devices.

Figure 6:
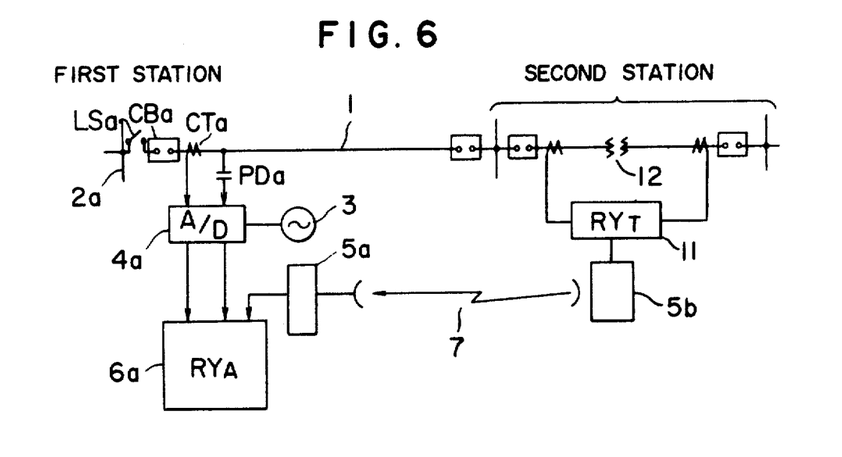
FIG. 6 is a block diagram showing another embodiment of the present invention.

In FIG. 6, there is illustrated a block diagram showing another embodiment of the present invention. In this embodiment, the protective relay 6a is operated as a digital distance relay which protects the power transmission line by utilizing current and voltage data from one terminal station. The current and the voltage data of the power transmission line 1 connected through a circuit breaker CBa to a bus line 2a of the terminal station A are picked up by a current transformer CTa and a potential device PDa, and applied to an A/D converter 4a. The A/D conversion operation of the converter 4a is carried out at a constant frequency generated by an oscillator 3, and the output of the A/D converter is applied to a digital protective relay 6a. On the other hand, in an opposite end station B, a transformer 12 is protected by a transformer protective relay 11 of a differential current type. Based on a large amount of higher harmonics contained in the differential currents, the relay 11 can detect an excitation current rush flowing into the transformer. The detection of the excitation current rush of the transformer by the transformer protective relay device 11 is notified through the transmitting device 5b to the electric station A. In the station A, a control signal, indicative of the flow of the rushing current, received through the transmitting device 5a is applied to the digital protecting relay 6a.

Figure 7:
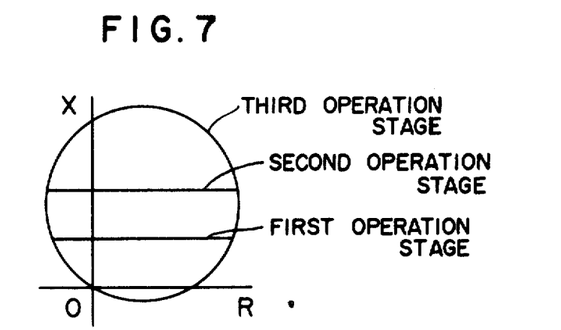
FIG. 7 is a diagram showing an example of a protective relaying operation of the embodiment shown in FIG. 6.

The protecting procedure of the relay 6a now operating as a distance relay is shown in FIG. 7. In this drawing, the first and second operational stages correspond to the protections based on reactance elements, and third stage corresponds to the protection based on mho elements. In an ordinary example, the first operational stage is set for the protection of the ordinary range (transmission line 1) to be protected by the distance relay 6a, the second stage is set to include the station B in its protection range, and the third stage is set to include the subsequent range (from the station B to the next following station) in its protecting range.

Generally speaking, a distance protective relay device having relay elements covering the transformer in the opposite end in its protective range (as in the second and third stages in FIG. 7) tends to become inoperative due to the rush current flowing into the transformer. Ordinarily the detection of the excitation current rush into a transformer is carried out by measuring the contents of higher harmonics in the current. If the current measured by the CTa is merely an excitation current rush of the transformer, erroneous operation of the distance relay can be prevented by detecting the contents of higher harmonics in the current. However, when the current detected by the current transformer is a combination of the rush current and a load current, the percentage of the higher harmonics is lowered, thus making it difficult to detect the rush current of the transformer.

In the embodiment shown in FIG. 6, the erroneous operation of the distance relay device due to the rush current of the transformer can be prevented. In this embodiment, since the differential protective relay 11 for the transformer 12 is operated in response to the differential currents, the operation thereof is not affected by the load current. For this reason, the excitation current rush of the transformer can be surely detected from the percentage of the higher harmonics in accordance with a known practice.

In a case where a load is connected to the electric station B, and all apparatus in the electric station B are initially charged from the electric station A, a current corresponding to the sum of the load current and the excitation current rush of the transformer flows through the power transmission line 1. Since the load current is merely a passing current for the differential protective relay 11 for the transformer 12, only the excitation current rush of the transformer is picked up as a difference current. When an excitation current rush is detected from the percentage of the harmonics in the differential current, the control condition signal is transmitted through the devices 5b, data transmitting line 7, and the device 5a to the digital protective relay 6a. In the relay 6a, upon reception of the control condition signal, the operational steps of the relay elements which otherwise operates erroneously by the excitation current rush of the transformer are controlled as described hereinbelow.

Figure 8:
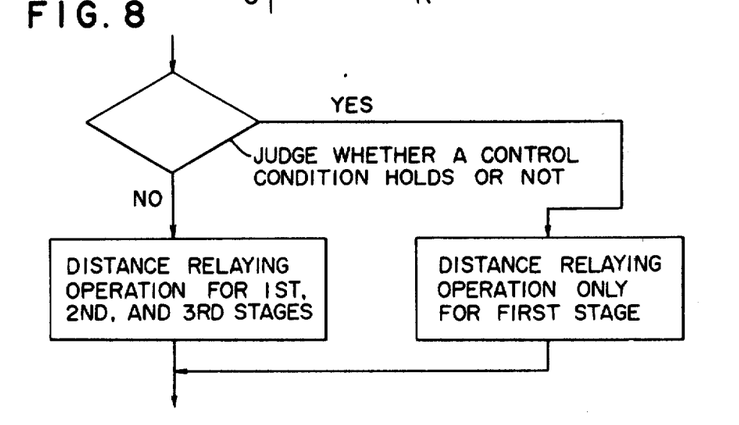
FIGS. 8 through 10 are flow charts for the operation shown in FIG. 7.
Figure 9:
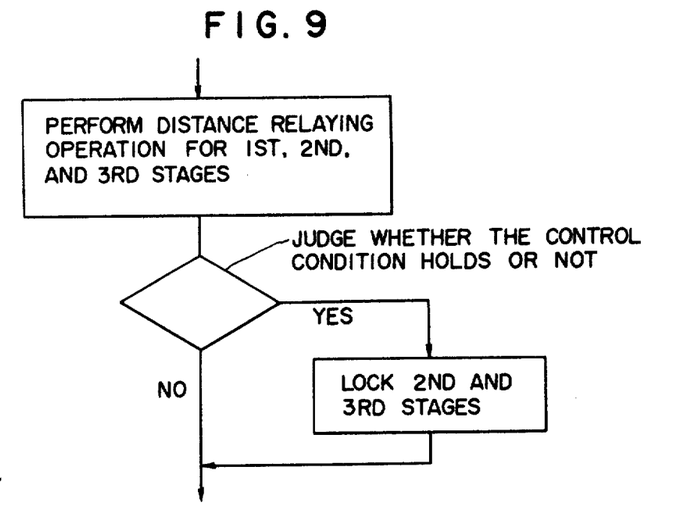
Figure 10:
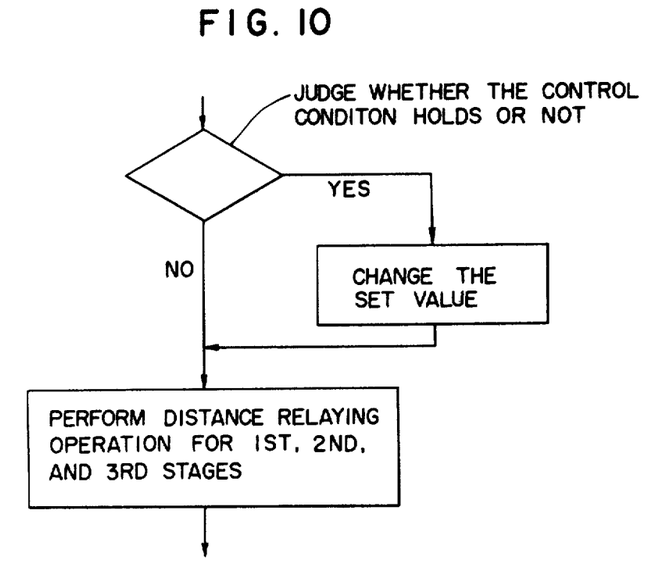

In FIGS. 8, 9, and 10, there are illustrated flow charts for executing the above described controls. The flow chart shown in FIG. 8 corresponds to a case where the operations of relay elements tending to operate in vain due to the rush current of the transformer are avoided when a control condition is established. In an example shown in FIG. 9, although the above described operations of the relay elements are carried out, the results of the operations are made invalid. In either of the examples, the relay elements tending to be operated in vain due to the rush current of the transformer are substantially locked.

Differing from the above described examples, an example shown in FIG. 10 is of an arrangement wherein, when a control condition holds as in the case of a rush current of the transformer, the distance setting value and the operating time setting value of relay elements which tend to become invalid due to the rush current are changed. That is, when the current rush flows, the distance settings for the second and third steps of the relay operation are shortened so that the transformer is not included in the protecting range, or the operation time settings for these steps are made longer so that the excitation current is reduced therewithin. As described above, the condition that the excitation current rush of the transformer 12 is detected by the differential relay 11 is introduced into the distance protective relay 6a, and the process steps of the relay 6a is thereby controlled so that the invalid operation of the relay 6a due to the current rush is surely prevented.

Although a differential relay device and a distance relay device have been described above for the protection of a power transmission line, the invention is not necessarily limited to these examples, but it involves the digital protective relay devices of various types which can control protective operations of the power transmission system depending on the input conditions related to the electric stations and the associated devices. The digital protective relay devices are thus permitted to protect electric power systems appropriately depending on the variation of the protective conditions, and contribute much to the safe and stable operation of the electric power transmission systems. Furthermore, the protective operation of the digital protective relay devices is ordinarily carried out by programs stored in the digital operational devices, and therefore any variation in the protective operation and the control procedure can be dealt with by a modification or change of the programs, and no alterations of the hardware are required.

In FIG. 11, there is illustrated still another embodiment of the present invention, which is applied to a multiterminal power transmission system. In this embodiment, a third electric station C is further connected in a branched manner to the electric power transmission line 1. The third electric station C involves a bus line 2c, a disconnecting switch LSc, a circuit breaker CBc, and a current transformer CTc for detecting an electric current Ic flowing from the electric station C into the power transmission line 1. An analog/digital converter 4c connected to the common oscillator 3 converts the electric current Ic detected by the current transformer CTc into a digital value. A data transmitting and receiving terminal 5c is also provided for transmitting the output of the A/D converter 4c over a data line 7 to the data transmitting and receiving terminals 5a and 5b of the first and second electric stations, and for receiving the outputs of the A/D converters 4a and 4b in the first and second electric stations through the data transmitting and receiving terminals 5a and 5b, respectively over the data line 7.

A digital protective relay 6c of a construction similar to the relays 6a and 6b of the first and second electric stations A and B is provided for receiving the output of the A/D converter 4c directly, and the outputs of the A/D converters 4a and 4b indirectly through the data transmitting and receiving terminals 5a, 5b, and 5c.

A control condition transmitting and receiving terminal 8c may also be provided as shown for transmitting a control condition, as it occurs, to the digital protective relays 6a and 6b of the first and second stations A and B through the control condition transmitting and receiving terminals 8a and 8b over the data transmission line 9, or the terminal 8c and the data transmission line 9 may otherwise be combined with the terminal 5c and the data transmission line 7, as described hereinbefore with respect to FIGS. 1 and 5.

A differential protective relay as designated by numeral 10 in FIG. 1 may also be provided for the protection of an electric apparatus such as a transformer. When a fault occurs in the transformer, the differential protective relay 10 operates, thereby tripping the circuit breaker CBc to constitute a control condition.

An operation of the aforementioned embodiment will be apparent in the flow chart shown in FIG. 12.

When a control condition holds in the station B, the electric current $I_B$ is assumed to be zero. Thus, the vector sum $I_D=I_A+I_B+I_C=I_A+I_C$ is compared with a set value, and when the vector sum $I_D$ is greater than the set value, the circuit breaker CBa is tripped.

We claim:

1. In a digital protective relaying device for protecting an electric power transmission system including an electric power transmission line having a first electric station and a second electric station at both ends thereof, each electric station including a circuit breaker, a disconnecting switch, a detector for detecting an electric value related to an input into the electric power transmission line, an A/D converter for converting an output of the detector into a digital value, a data transmitting and receiving terminal connected to receive the output of the A/D converter and to send the same to a data transmitting and receiving terminal in the other electric station through a data transmission line extending between the two data transmitting and receiving terminals, and a current differential protective relay connected to receive outputs of the two A/D converters for carrying out a relaying operation based on a vector sum of the two A/D converter outputs, one directly and the other through said data transmission line, the improvement wherein each current differential protective relay provided in said electric stations including a digital computer which, upon reception of a control condition from the other electric station, changes its data processing steps so as to neglect the output of said A/D converter in the other electric station and to operate the differential protective relay as an over-current protective relay solely according to the output of the A/D converter in the electric station receiving the control condition, said control condition representing one of tripping of the circuit breaker, opening of the disconnecting switch, and locking of the data transmitting and receiving terminal occurring in the other electric station.

2. A digital protective relaying device as set forth in claim 1 wherein another pair of data transmitting and receiving terminals are further provided at the first and the second stations, and a control condition occurring at either one of the stations is transmitted through a control condition transmitting line between said another pair of data transmitting and receiving terminals to the other station.

3. A digital protective relaying device as set forth in claim 1 wherein each of said control conditions originating in one of said stations is transmitted together with the output of the A/D converter of said one station in the form of serially arranged bits to the protective relay in the other station.

4. A digital protective relaying device as set forth in claim 1 wherein when a blind point fault occurs between said electric value detector and said circuit breaker in one of said stations, the circuit breaker is tripped by said differential protective relay of said one station for protecting said one station.

5. In a digital protective relaying device for protecting an electric power transmission system including an electric power transmission line having a first electric station and a second electric station provided at both ends thereof, said first electric station including a circuit breaker and a disconnecting switch provided for interrupting said power transmission line, a potential transformer means and a current transformer for detecting voltage and current of said power transmission line, an A/D converter for converting outputs of said potential transformer means and said current transformer into digital values, a signal receiving terminal for receiving a signal sent from the second electric station through a signal transmission line, and a distance protective relay connected to receive the outputs of said A/D converter and said signal receiving terminal; said second electric station including a power transformer, a differential protective relay for protecting said power transformer, and a signal transmitting terminal for transmitting a signal to the first electric station, the improvement wherein said second electric station further includes means cooperative with said differential protective relay for detecting an excitation current rush flowing into the power transformer from said electric power transmission line, and transmitting a control condition signal through said signal transmitting terminal toward the first electric station, said distance protective relay in said first electric station including a digital computer which, upon reception of said control condition signal sent from the second electric station, changes its data processing steps so as to increase a delay time or to decrease a protective distance of said distance protective relay.

* * * * *